United States Patent Office 3,806,555
Patented Apr. 23, 1974

3,806,555
PROCESS FOR CROSSLINKING OLEFIN POLYMERS
Joji Nagaoka, Tokyo, Nobuaki Minamii and Akio Henmi, Kawagoe, and Teruo Uchida, Omiya, Japan, assignors to Wako Pure Chemical Industries, Ltd., Osaka, Japan
No Drawing. Filed Mar. 22, 1972, Ser. No. 236,974
Int. Cl. C08f 1/60, 15/00, 27/00
U.S. Cl. 260—878 R                              13 Claims

ABSTRACT OF THE DISCLOSURE

A process for crosslinking an olefin polymer or copolymer capable of being molded by heating the olefin polymer or copolymer in the presence of a free radical catalyst and a crosslinking adjuvant, characterized in that the crosslinking adjuvant is triallyl trimellitate and/or trimethallyl trimellitate. The use of the above-mentioned crosslinking adjuvant results in such advantages that the crosslinking efficiency is enhanced and the crosslinked polymer or copolymer is improved in heat resistance, chemical resistance, mechanical strength and electrical properties.

---

This invention relates to a process for chemically crosslinking polymers or copolymers of olefins (hereinafter referred to as "olefin polymers"). More particularly, the present invention pertains to a process for crosslinking olefin polymers by heating the polymers in the presence of a free radical catalyst and, as a cross-linking adjuvant, triallyl trimellitate (hereinfter abbreviated to "AM") and/or trimethallyl trimellitate (hereinafter abbreviated to "MM"). The use of the above-mentioned crosslinking adjuvant results in such advantages that the crosslinking efficiency is enhanced and the cross-linked polymers are improved in various characteristics, particularly in heat resistance, chemical resistance, mechanical strength and electrical properties.

Olefin polymers are chemically stable, and cross-linking reaction products thereof have various characteristics. Accordingly, the olefin polymers have widely been used in industry. Because of their being chemically stable, however, the olefin polymers cannot be crosslinked by adoption of a crosslinking agent or a crosslinking process which is conventionally used in the case of unsaturated hydrocarbon rubbers. Further, for economical and other reasons, it is more practical to crosslink the olefin polymers by a chemical process than according to an irradiation process, which is a physical process. Particularly preferable is a crosslinking process using a free radical catalyst such as an organic peroxide or an azo compound. In practice, however, the crosslinking with an organic peroxide alone, for example, is low in crosslinking efficiency and cannot be expected to result in an improvement in various characteristics.

Moreover, in the case of olefin polymers containing such units as propylene, vinyl chloride or the like, such a problem is brought about that the polymers are considerably cut or modified during the crosslinking step, with the result that the crosslinking yield is lowered and no desired characteristics can be attained. With an aim to solve the above-mentioned problem, various blending agents have been studied, and the use of sulfur, quinone compounds and polyfunctional monomers as crosslinking adjuvants has been proposed. However, there has not been provided any crosslinking adjuvant capable of sufficiently settling the problem concerning the crosslinking of olefin polymers.

As a result of extensive research, the present inventors have found crosslinking adjuvants capable of sufficiently imparting to the olefin polymers various characteristics necessary for the uses thereof over a wide field, thereby accomplishing a useful crosslinking process which can give an excellent crosslinking efficiency and which can be easily and economically practiced on a commercial scale.

In accordance with the present invention, there is provided a process for crosslinking an olefin polymer capable of being molded which comprises heating the olefin polymer in the presence of a free radical catalyst and, as a crosslinking adjuvant, triallyl trimellitate or trimethallyl trimellitate or a mixture of the two.

The crosslinking adjuvant used in the present process is AM or MM or a mixture of the two. The said AM or MM may be prepared on a commercial scale by reacting trimellitic acid or an anhydride thereof with allyl or methallyl alcohol or with an allyl or methallyl halide.

Although AM is commercially available, MM is a novel compound, which has been discovered by the present inventors, and which may preferably be prepared by the following method: Trimellitic anhydride and a slight excess of methallyl chloride or bromide are healed at about refluxing temperature in the presence of a base in a suitable solvent, and when the reaction is finished, the organic liquid layer is separated or extracted and then washed with water, after which the product is subjected to a conventional purification procedure to obtain MM having a boiling point of 204–6° C./2.5 mm. Hg. As the base, there may be used sodium hydroxide, potassium hydroxide, sodium carbonate, potassium bicarbonate, ammonia, pyridine, dimethylamine, ethylamine or diethylaniline. The reaction is preferably effected at a pH of 9 or less.

The amount of the crosslinking adjuvant added to the olefin polymer is not particularly limited, and is variable within a wide range according to various charactertistics, particularly heat resistance, chemical resistance, mechanical strengths and electrical properties, of the resulting crosslinked product. However, it is preferable to use the resulting crosslinked product. However, it is preferable to use the crosslinking adjuvant in an amount of 0.05 to 50 parts by weight per 100 parts by weight of the olefin polymer. The addition of the crosslinking adjuvant can result in an increase of the crosslinking efficiency obtained by adding the free-radical catalyst alone. The larger the amount of the crosslinking adjuvant added in a certain range, the higher the crosslinking efficiency becomes. Moreover, an increased amount of the crosslinking adjuvant does not result in such a degradation of characteristics as caused by increasing the amount of the free radical catalyst. Thus, the amount of the crosslinking adjuvant added is not irrelevant to the amount of the free radical catalyst or to the crosslinking efficiency or the characteristics of the resulting crosslinked molded article.

Olefin polymers usable in the present invention are any polymers or copolymers containing, as monomers or co-monomers, organic compounds having terminal unsaturated group represented by the formula $>C=CH_2$. Examples of the olefin polymers include polyolefins, such as polyethylene, polypropylene, etc.; polyvinyl chloride, various chlorinated polyolefins, such as chlorinated polyethylene, etc.; copolymers of olefins, such as ethylene-propylene copolymers, ethylene-butylene copolymers, etc.; copolymers of an olefin and other terminally unsaturated compound, such as ethylene-vinyl acetate copolymer, ethylene-vinyl chloride copolymer, propylene-vinyl chloride copolymer etc.; and ethylene-propylene-diene terpolymers, such as ethylene - propylene - dicyclopentadiene terpolymer, ethylene - propylene - cyclooctadiene terpolymer, ethylene-propylene-hexadiene terpolymer, ethylene-propylene-ethyltridecadiene terpolymer, ethylene-propylene-ethylidenenorbornene terpolymer, ethylene - propylene - methylidenenorbornene terpolymer, etc., though these are not limitative. The olefin polymers used in the invention are such as can be molded.

As the free radical catalyst, any compound capable of liberating a free radical at the crosslinking temperature may be used. Generally, an organic peroxide or an azo compound is preferable. Examples of such free radical catatlyst include dicumyl peroxide,
1,3-bis(α-t-butylperoxyisopropyl)benzene,
2,5-dimethyl-2,5-bis(t-butylperoxy)hexane,
2,5-dimethyl-2,5-bis(t-butylperoxy)-hexyne(3),
di-t-butyl peroxide,
t-butyl perbenzoate,
tetrachloro-t-butyl peroxide,
di(α-phenylethyl) peroxide,
di(α-p-isopropylcumyl) peroxide,
α-cumyl-α-p-t-butylcumyl peroxide,
α-cumyl-α-p-xylyl peroxide,
t-butyl-α-cumyl peroxide,
t-butyl-triphenylmethyl peroxide,
di-α-p-cymyl peroxide,
dibenzyl peroxide,
bis(α,α-dimethylnaphthylmethyl) peroxide,
benzyl(α-methylbenzyl) peroxide,
benzyl(α-methyl-p-methylbenzyl) peroxide,
benzyl(α-methyl-p-isopropylbenzyl) peroxide,
benzoyl peroxide,
acetyl peroxide,
lauroyl peroxide,
ascaridol,
2,2'-azobis-isobutyronitrile,
2,2'-azobis(2,4-dimethyl valeronitrile),
1,1'-azobis(cyclohexane-1-carbonitrile),
phenylazo-2,4-dimethyl valeronitrile,
phenylazo-2,4-dimethyl-4-methoxy valeronitrile,
2-cyano-2-propylazo formamide,
2,2'-azoisobutane,
1,1'-azobis(2-phenylethane),
1,1'-azobis(3-phenylpropane), etc.

The amount of the free radical catalyst added is not particularly limited, and may suitably be varied depending on the properties of the polymer to be crosslinked. However, it is preferable that the catalyst is used in an amount of 0.05 to 10 parts by weight per 100 parts by weight of the olefin polymer. In case an azo compound as the free radical catalyst is used in a large amount, there is brought about the disadvantage that bubbles are incorporated into the resulting crosslinked and molded article, but no such disadvantage is brought about at all when the amount of the azo compound is less than 6 parts by weight.

The above-mentioned components are blended together according to a known procedure, and the resulting blend is transferred to a mold or the like and is treated in a hot press, whereby a desired crosslinked and molded article can easily be produced with high efficiency. If necessary, the said components may be used in combination with any of such additives as antioxidants, fillers, pigments, plasticizers and stabilizers.

The crosslinking temperature is above the thermal decomposition temperature of the free radical catalyst used and is selected from temperatures sufficient for the catalyst to form a free radical. The crosslinking time is markedly shortened by use of AM or MM, and can be varied depending upon the crosslinking temperatures, though it ranges preferably from 10 sec. to 60 min., particularly preferably from 1 to 5 min. This is another advantage of the present invention.

The present invention is further explained in detail below with reference to examples, which are only by way of illustration and not by way of limitation. In the examples, the preparation of each crosslinked resin and the measurement in physical properties thereof were carried out in the following manner:

The mixing of the olefin polymer with other components was carried out by means of a two-roll mill maintained at a definite temperature, and the resulting mixture in the form of a sheet was placed in a metal mold and then heated at a definite temperature for a definite period of time by use of a hot press of about 50 kg./cm.$^2$ to prepare a crosslinked sample. The measurement in tensile strength of the sample was conducted at 20° C. by use of an Instron tester. The gel percent of the sample was measured in such a manner that the sample was treated for 10 hours in refluxed toluene (provided that in case polyvinyl chloride had been used, the sample was treated for 4 hours in dimethylformamide at 90° C.), the insoluble portion of the sample was dried and then weighed, and the gel percent was calculated according to the following equation:

$$\text{Gel percent} = \frac{\text{Weight of insoluble portion of sample}}{\text{Total weight of sample}} \times 100$$

In the examples, all the numerals and percentages showing the amounts are parts by weight per 100 parts of the olefin polymer and percentages by weight, unless otherwise specified.

Reference example 210 parts by weight of 20% potassium carbonate solution, 38 parts by weight of trimellitic anhydride and 60 parts by weight of methallyl chloride were mixed and gently heated with stirring under reflux for 8 hrs., after which the organic liquid layer was extracted with benzene, dried, concentrated and then distilled to obtain 65 parts by weight of methallyl trimellitate. The result of elementary analysis of the product was as follows:

Calcd. ($C_{21}H_{24}O_6$): C, 67.73%; H, 6.50%; O, 25.78%.
Found: C, 67.69%; H, 6.71%; O, 25.60%.

EXAMPLE 1

| Blend | A | B | C |
|---|---|---|---|
| Components: | | | |
| Low density polyethylene (density: 0.921, M.I.: 1.5) (Mirason-9, trade name of Mitsui Polychemical, Japan) | 100 | 100 | 100 |
| Stearic acid | 1 | 1 | 1 |
| Dicumyl peroxide | 2 | 2 | 2 |
| AM | 1 | 5 | |

Each of the above-mentioned blends A, B and C was treated at a crosslinking temperature of 150° C. As the result, the relation between the heating time for crosslinking and the tensile strength, elongation and gel percent of the resulting crosslinked resin was as set forth in the following table:

| | Blend A | | | | | | Blend B | | | | | | Blend C | | | | | |
|---|---|---|---|---|---|---|---|---|---|---|---|---|---|---|---|---|---|---|
| Heating time (minutes) | 0 | 5 | 10 | 15 | 30 | 40 | 0 | 5 | 10 | 15 | 30 | 40 | 0 | 5 | 10 | 15 | 30 | 40 |
| Tensile strength (kg./cm.$^2$) | 127 | 171 | 190 | 201 | 194 | 190 | 126 | 175 | 192 | 215 | 210 | 195 | 126 | 123 | 158 | 160 | 165 | 172 |
| Elongation (percent) | 563 | 637 | 640 | 638 | 640 | 630 | 550 | 653 | 651 | 655 | 642 | 586 | 640 | 623 | 619 | 625 | 630 | 635 |
| Gel (percent) | | 43.0 | 82.7 | 85.0 | 84.8 | 84.5 | | 50.3 | 85.1 | 93.2 | 89.0 | 87.0 | Dissolved | 40.0 | 43.5 | 45.7 | 60.1 | |

As is clear from the above table, each blend was quick in gelation, i.e. shortened in crosslinking time, and the desired tensile strength and elongation were attained at earlier stages.

EXAMPLE 2

The blend A mentioned in Example 1 was treated at a crosslinking temperature of 190° C. to obtain the following results.

| | Blend A | | | | | |
|---|---|---|---|---|---|---|
| Heating time (mintues) | 1 | 2 | 3 | 5 | 10 | 15 |
| Tensile strength (kg./cm.$^2$) | 201 | 202 | 199 | 195 | 191 | 185 |
| Elongation (percent) | 607 | 625 | 610 | 599 | 580 | 575 |
| Gel (percent) | 90.0 | 90.5 | 91.0 | 88.5 | 86.1 | 85.0 |

Comparing the above results with those in Example 1, it is found that when the crosslinking temperature is higher, the heating time can be much more shortened.

EXAMPLE 3

The blend D, which was identical with the blend A in Example 1 except that 1 part of MM obtained in the reference example was used in place of the AM, was thermally treated in the same manner as in Example 1 at a crosslinking temperature of 165° C. to obtain the results as set forth in the following table:

| | Blend D | | | | | | Blend C | | | | | |
|---|---|---|---|---|---|---|---|---|---|---|---|---|
| Heating time (minutes) | 0 | 5 | 10 | 15 | 30 | 40 | 0 | 5 | 10 | 15 | 30 | 40 |
| Tensile strength (kg./cm.$^2$) | 128 | 184 | 208 | 199 | 197 | 185 | 126 | 154 | 158 | 162 | 175 | 159 |
| Elongation (percent) | 565 | 605 | 600 | 592 | 575 | 565 | 640 | 570 | 575 | 570 | 578 | 567 |
| Gel (percent) | | 70.8 | 91.0 | 91.1 | 90.4 | 85.1 | | 27.7 | 42.5 | 53.5 | 66.5 | 55.8 |

From Examples 1 and 3, it is understood that by addition of AM or MM, the crosslinking time is shortened and the resulting crosslinked resin has an increased tensile strength and an increased gel content.

EXAMPLES 4-6

The blends E, F and G comprising 100 of polyvinyl chloride having an average degree of polymerization of 1.070 and a bulk density of 0.50 (TK-1000, trade name of Shinetsu Kagaku, Japan), 50 of dioctyl phthalate (DOP), 5 of dibutyltin dilaurate (DBL), 2 of α,α-bis(t-butylperoxy)-m-isopropylbenzene (catalyst) and 5, 15 and 30, respectively, of AM were thermally treated for 20 minutes under the same conditions as in Example 3 to obtain crosslinked resins having the following tensile strength and gel percent.

| Example number | Blend | PVC | DOP | DBL | Catalyst | AM | Tensile strength (kg./cm.$^2$) | Elongation (percent) | Gel (percent) |
|---|---|---|---|---|---|---|---|---|---|
| 3 | E | 100 | 50 | 5 | 2 | 5 | 230 | 305 | 65 |
| 4 | F | 100 | 50 | 5 | 2 | 15 | 235 | 255 | 69 |
| 5 | G | 100 | 50 | 5 | 2 | 30 | 250 | 210 | 70 |

In contrast thereto, a crosslinked resin prepared in the same manner as above, except that no AM was added, had a tensile strength lower than that of the starting polyvinyl chloride.

EXAMPLE 7

| Blend | H | I | J |
|---|---|---|---|
| Components: | | | |
| Ethylene-propylene-dicyclopentadiene resin having an iodine number of 12 and a Mooney viscosity (ML$_{1+4}$) at 100° C. of 40 (DCPD-1045, trade name of Mitsui Petrochemical, Japan) | 100 | 100 | 100 |
| Zinc white | 5 | 5 | 5 |
| Stearic acid | 2 | 2 | 2 |
| Talc | 100 | 100 | 100 |
| Dicumyl peroxide | 3 | 3 | 3 |
| AM | 2 | 1 | |
| MM (obtained in the Reference Example) | | 1 | |

The above-mentioned blends H, I and J were thermally treated for 20 minutes under the same crosslinking conditions as in Example 3 to obtain the results as set forth in the following table:

| Blend | H | I | J |
|---|---|---|---|
| Tensile strength (kg./cm.$^2$) | 75 | 82 | 57 |
| Elongation (percent) | 657 | 670 | 595 |

EXAMPLE 8

| Blend | K | L |
|---|---|---|
| Component: | | |
| Ethylene-vinyl acetate resin having a vinyl acetate content of 19% (EVAFLEX-P-1905, trade name of Mitsui Polychemical, Japan) | 100 | 100 |
| Carbon black HAF | 50 | 50 |
| 2,2'-azobisisobutyronitrile | 2 | 2 |
| AM | 3 | |

The above-mentioned blends K and L were thermally treated for 20 minutes under the same conditions as in Example 1 to obtain the results as set forth in the following table:

| Blend | K | L |
|---|---|---|
| Tensile strength (kg./cm.$^2$) | 200 | 110 |
| Elongation (percent) | 315 | 155 |
| Shore hardness: | | |
| 20° C | 95 | 83 |
| 75° C | 83 | 51 |
| Elasticity (percent): | | |
| 20° C | 35 | 27 |
| 75° C | 56 | 35 |

EXAMPLE 9

| Blend | M | N |
|---|---|---|
| Components: | | |
| Polyethylene (same as in Example 1) | 100 | 100 |
| Stearic acid | 1 | 1 |
| Dicumyl peroxide | 1 | 2 |
| MM (obtained in the Reference Example) | 2 | 2 |

The above-mentioned blends M and N were thermally treated at a crosslinking temperatures of 165° C. to obtain the results as set forth in the following table, in which are also shown the results obtained by thermally treating at said temperature the blends A and C used in Example 1.

| Blend | A | C | M | N |
|---|---|---|---|---|
| Tensile strength (kg./cm.$^2$) | 210 | 158 | 209 | 227 |
| Elongation (percent) | 632 | 575 | 625 | 598 |
| Gel (percent) | 90.0 | 42.5 | 89.5 | 91.0 |

As mentioned above, the use of AM and/or MM as a crosslinking adjuvant in crosslinking olefin polymers with a free radical catalyst results in the enhancement of the crosslinking efficiency, whereby various properties of the polymers can be improved. In particular, the gel percent is increased, whereby the heat distortion temperature is elevated and the distortion due to a load becomes remarkably small. For instance, when polyethylene, dicumyl peroxide, stearic acid and AM were mixed in the following proportions and heated at 165° C. for 14 min., the distortion and the gel percent of the resulting crosslinked polymer were as shown in the following table (according to JIS 3606 and 3005):

| Run number | Parts by weight | | | | Percent | | |
|---|---|---|---|---|---|---|---|
| | Polyethylene | DCP | Stearic acid | AM | Distortion[1] | Distortion[2] | Gel |
| 1 | 100 | 2 | 1 | | 24.6 | 59.0 | 67.6 |
| 2 | 100 | 2 | 1 | 1 | 2.1 | 19.9 | 87.0 |
| 3 | 100 | 1 | 1 | 1 | 4.2 | 28.5 | 81.0 |

NOTES:
DCP refers to dicumyl peroxide.
Distortion [1] is under a load of 2 kg.
Distortion [2] is under a load of 4 kg.

As is clear from the above table, the distortions under a load of 2 kg. and 4 kg. in Run No. 2 are 1/10 and 1/3, respectively, of the distortions in Run No. 1 where no AM was added. Further, as seen from Run Nos. 1 and 3, the distortion under a load of 4 kg. when 2 parts by weight of dicumyl peroxide is used without using AM is reduced to 1/2 by substituting 1 part by weight of AM for 1 part by weight of the dicumyl peroxide. Moreover, the dielectric loss tangent (tan δ) and dielectric constant of polyethylene crosslinked by means of 1 part by weight of AM and 2 parts by weight of dicumyl peroxide per 100 parts by weight of polyethylene is as very low as $0.5 \times 10^{-3}$ and 2.1 at 3 mHz., respectively. The dielectric constant was not varied even when the amount of AM was varied. In addition, AM serves as a plasticizer in blending prior to crosslinking, and hence, a conventional plasticizer, which generally results in a degradation of electrical properties of polymers, is made unnecessary.

What is claimed is:

1. A crosslinked polymer obtained by heating at least one polymer selected from the group consisting of polyolefins, copolymers of olefins, ethylene-vinyl acetate copolymer, and ethylene-propylene-diene terpolymers together with triallyl trimellitate, trimethallyl trimellitate or a mixture of the two in the presence of a free radical catalyst.

2. A crosslinked polymer according to claim 1, wherein the polymer is selected from the group consisting of polyethylene and polypropylene.

3. A crosslinked polymer according to claim 1, wherein the polymer is selected from the group consisting of ethylene-propylene copolymer and ethylene-butylene copolymer.

4. A crosslinked polymer according to claim 1, wherein the polymer is selected from the group consisting of ethylene-propylene-dicyclopentadiene terpolymer, ethylene-propylene-cyclooctadiene terpolymer, ethylene-propylene-hexadiene terpolymer, ethylene - propylene - ethyltridecadiene terpolymer, ethylene-propylene-ethylidenenorbornene terpolymer, and ethylene-propylene-methylidenenorbornene terpolymer.

5. A crosslinked polymer according to claim 1, wherein the free radical catalyst is an organic peroxide or an azo compound.

6. A crosslinked polymer according to claim 5, wherein the organic peroxide is dicumyl peroxide, 1,3-bis-(α-t-butyl-peroxyisopropyl)benzene, 2,5 - dimethyl-2,5-bis(t-butylperoxy)hexane, 2,5-dimethyl-2,5-bis(t-butylperoxy)hexyne (3), di-t-butyl peroxide, t-butyl perbenzoate, tetrachloro-t-butyl peroxide, di(α-phenylethyl)peroxide, di-(α-p-isopropylcumyl)peroxide, α-cumyl-α-p-t-butylcumyl peroxide, α-cumyl-α-p-xylyl peroxide, t-butyl-α-cumyl peroxide, t-butyl-triphenylmethyl peroxide, di-α-p-cymyl peroxide, dibenzyl peroxide, bis(α,α-dimethylnaphthylmethyl)peroxide, benzyl(α-methylbenzyl) peroxide, benzyl(α-methyl-p-methylbenzyl) peroxide, benzyl(α-methyl-p-isopropylbenzyl) peroxide, benzoyl peroxide, acetyl peroxide, lauroyl peroxide, or ascaridol.

7. A crosslinked polymer according to claim 5, wherein the azo compound is 2,2'-azobisisobutyronitrile, 2,2'-azobis(2,4-dimethyl valeronitrile) or 1,1'-azobis(cyclohexane-1-carbonitrile), phenylazo-2,4-dimethyl valeronitrile, phenylazo-2,4-dimethyl-4-methoxy valeronitrile, 2-cyano-2-propylazoformamide, 2,2'-azobisisobutane, 1,1'-azobis-(2-phenylethane) or 1,1'-azobis(3-phenylpropane).

8. A crosslinked polymer according to claim 1, wherein the amount of the free radical catalyst is 0.05 to 10 parts by weight per 100 parts by weight of the polymer or copolymer.

9. A crosslinked polymer according to claim 1, wherein the amount of the crosslinking adjuvant is 0.05 to 50 parts by weight per 100 parts by weight of the polymer.

10. A crosslinked polymer according to claim 1, wherein the heating temperature is higher than the decomposition temperature of the free radical catalyst and is a temperature high enough to form a free radical.

11. A crosslinked polymer according to claim 1, wherein the heating time is 1 to 5 minutes.

12. A crosslinked polymer according to claim 1, wherein the polymer contains any of antioxidants, fillers, pigments, plasticizers and stabilizers.

13. A crosslinked polymer according to claim 1, wherein the heating time is 10 seconds to 60 minutes.

References Cited

UNITED STATES PATENTS

| 3,261,888 | 7/1966 | Cornell et al. | 260—878 R |
| 3,312,757 | 4/1967 | McRitchie | 260—878 R |

FOREIGN PATENTS

| 905,711 | 9/1962 | Great Britain | 260—884 |

OTHER REFERENCES

Murphy, Jr. et al.: Def. Pub. Search Copy of S.N. 135,207, filed Apr. 19, 1971, published in 900 O.G. 1231 on July 25, 1972, Defensive Publication No. T900,019 (260/878 R).

JAMES SEIDLECK, Primary Examiner

A. HOLLER, Assistant Examiner

U.S. Cl. X.R.

260—78.40, 80.78, 87.3, 88.2 S, 93.7, 94.9 GA